United States Patent [19]

Nielsen

[11] Patent Number: 4,944,997

[45] Date of Patent: Jul. 31, 1990

[54] ELECTROSTATOGRAPHIC RECORDING MATERIAL

[75] Inventor: Norman A. Nielsen, San Jose, Calif.

[73] Assignee: Xerox Corporation, Stamford, Conn.

[21] Appl. No.: 272,848

[22] Filed: Nov. 18, 1988

[51] Int. Cl.[5] ........................ B23B 23/08; G03Q 13/22

[52] U.S. Cl. .................................... 428/327; 428/340; 428/341; 428/342; 428/513; 428/514; 428/512; 428/479.6; 428/481

[58] Field of Search ............... 428/513, 327, 340, 344, 428/342

[56] References Cited

U.S. PATENT DOCUMENTS

| | | | |
|---|---|---|---|
| 3,247,290 | 4/1966 | Werkman et al. | 260/897 |
| 4,081,583 | 3/1978 | Akiyama et al. | 428/521 |
| 4,113,842 | 9/1978 | Wells | 430/41 |
| 4,259,425 | 3/1981 | Serlin | 430/56 |
| 4,272,569 | 6/1981 | Shaw et al. | 428/514 |
| 4,331,508 | 5/1982 | Miyama et al. | 162/135 |
| 4,332,851 | 6/1982 | Hosomura et al. | 428/325 |
| 4,624,544 | 11/1986 | Jeromin | 355/3 R |
| 4,780,357 | 10/1988 | Akao | 428/461 |

*Primary Examiner*—P. C. Ives

[57] ABSTRACT

A coated paper for use in electrostatogrpahic processes for receiving a toner image formed by a liquid developer comprises a substrate having bound thereto on at least one side generally smooth surface, spherical, bearing spacer particles having a particle size of from about 5 to about 15 micrometers.

12 Claims, 1 Drawing Sheet

ELECTROSTATOGRAPHIC RECORDING MATERIAL

CROSS REFERENCE TO RELATED APPLICATION

Attention is directed to copending U.S. patent application Ser. No. 07/115,010 now U.S. Pat. No. 4,812,383, entitled "Process for Forming Electrophotographic Images on a Self-Fusing Substrate", filed Oct. 29, 1987 in the name of D. Paul Foote.

BACKGROUND OF THE INVENTION

The present invention is directed to electrostatographic recording materials and in particular to coated papers which are suitable for use in electrostatographic imaging processes for receiving toner images formed with a liquid developer.

In an electrostatographic reproducing apparatus commonly in use today, a photoconductive insulating member is typically charged to a uniform potential and thereafter exposed to a light image of an original document to be reproduced. The exposure discharges the photoconductive insulating surface in exposed or background areas and creates an electrostatic latent image on the member which corresponds to the image areas contained within the usual document. Sunsequently, the electrostatic latent image on the photoconductive insulating surface is made visible by developing the image with developing powder referred to in the art as toner. Most development systems employ a developer material which comprises both charged carrier particles and charged toner particles which triboelectrically adhere to the carrier particles. During development the toner particles are attached from the carrier particles by the charge pattern of the image areas in the photoconductive insulating area to form a powder image on the photoconductive area. This image may subsequently be transferred to a support surface such as copy paper to which it may be permanently affixed by heating or by the application of pressure. Following transfer of the toner image to a support surface, the photoconductive insulating member is cleaned of any residual toner that may remain thereon in preparation of the next imaging cycle.

One of the more specific applications of the electrostatographic imaging process is in xeroradiography wherein X-ray mamographs on a xerographic plate are used in the detection of breast cancer. The automatic development of X-ray mamographs is described in detail in U.S. Pat. No. 4,038,943 and was commercially utilized in Xerox models 125 and 126. More recently, the Xerox 175 xeroradiographic medical imaging system has been made commercially available. The development system in this imaging system is described in U.S. Pat. No. 4,624,544 to Jeromin. Typically, the xeroradiographic development systems employ a liquid development rather than a dry development technique to provide the high resolution required in interpreting the X-ray images. These liquid development techniques also have the advantage in that they do not separately require a fusing step wherein by the application of heat and/or pressure the toner images fuse to the substrate. While satisfactory in producing developed images, certain difficulties arise. In particular, there is a tendency for the toned images produced from such liquid development techniques to be polished or appear glossy as a result of being contacted or rubbed by another surface. As a result, there is a non-uniform gloss of the toned image on the copy of the mamograph which can result in errors in interpretation and/or loss of information capable of being interpreted resulting in imperfect information upon which to make a medical diagnosis. Typically, the copy sheets or substrates which receive the liquid developer image are conventionally used papers such as Xerox 4024 paper. Typically, these papers are provided with a thin clay coating on at least one surface to improve the brightness or opacity of the paper.

PRIOR ART

It is also known to use conventional pigments as coatings on paper to provide a spacing function to keep the electrographic stylus heads a specific distance from the paper to thereby maximize electrical discharge. If the spacing is too great or too little, an imperfect image is obtained. These conventional pigments are typically smaller than 1 micron in particle size are preferably abrasive to maintain the writing heads clean. In addition, it has been common practice in the manufacture and use of transparency sheets to provide at least one side with a coating containing a pigment to lower the coefficient of friction between sheets so that they do not stick together.

U.S. Pat. No. 3,247,290 to Werkmen et al. describes a coating for paper comprising a blend of low density polyethylene and thermally degraded gigh density polyethylene applied as a continuous film to the paper. The coating material is described as performing several functions including that of a barrier against moisture vapor transmission, grease proofing agent, heat sealing, laminating medium, and improving the strength, abrasion resistance or the gloss of the substrate.

U.S. Pat. No. 4,331,508 to Miyama et al. describes a photographic support wherein polyethylene resin is coated on top of a sizing agent and a strength reinforced agent.

SUMMARY OF THE INVENTION

In accordance with the principle aspect of the present invention, a coated paper suitable for use in electrostatographic process for receiving a toner image formed with a liquid developer is provided which comprises a substrate having bound thereto on at least one side generally smooth surfaced, spherical, bearing, spacer particles having a particle size of from about 5 to about 15 micrometers in an amount sufficient to space a contacting object from the toner image on the substrate.

In a further aspect of the present invention, the spacer particles have a substantially uniform particle size and are uniformly distributed on at least one side of said substrate.

In a further aspect of the present invention, the particles have a particle size of from about 8 to about 12 micrometers.

In a further aspect of the present invention, the particles are polyolefin particles, preferably polyethylene, having a particle size of about 12 micrometers.

In a further aspect of the present invention, the paper has a basis weight of from about 75 to about 220 grams per square meter and a caliper of from about 4 to about 10 mils.

Pursuant to a further aspect of the present invention, an article of manufacture comprising a paper sheet substrate and a coating on at least one side thereof comprising generally smooth surfaced, spherical bearing, spacer particles in a resin binder is provided.

In a further aspect of the invention the spacer particles and resin binder have been applied to the substrate as a composition comprising 15 to 50% by weight solids of resin and spacer particles, of which about 10% by weight are spacer particles, and 50 to 85% by weight solvent the composition being applied at a rate of about 5 to 15 pounds per 3,000 square feet ream.

DESCRIPTION OF THE PREFERRED EMBODIMENT

Figure 1:
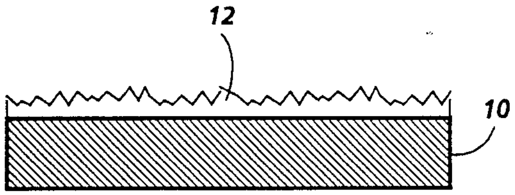
FIG. 1 is an enlarged schematic representation in cross section of a conventional copy sheet having a thin clay coating coated on one side thereof.

The invention will now be described with reference to a preferred embodiment of the coated paper according to the present invention.

In its broadest sense, the invention is directed to the use of particles to space an article contacting a sheet having a developed toner image thereon from the developed toner image so that it is not rendered glossy or otherwise disturbed. Accordingly, an appropriate balance between the number of spacer particles and the size of the spacer particles on the coated paper should be achieved. The spacer particles which will extend the resin binder binding them to the paper substrate by virtue of their size should be present in amounts sufficient to space any contacting object from the toned image on the paper substrate yet not be present in such an amount that the presence of the particles either interferes with the development process or otherwise obscures the toner image. As a general guide in achieving this balance between providing enough particles and providing too many particles, the particles are typically substantially uniformly distributed over about 10% of the area of the coated paper. Similarly with respect to the particle size of the spacer particles in that they should be large enough to provide a spacing between the toned image on the substrate but yet not be so large as to impede the development process or degrade the toned image. Generally, particles having a particle size of from about 5 to about 15 micrometers preferably 8 to 12 micrometers and most preferred 12 micrometers are effective in achieving this balance. The spacer particles provide a bearing surface between the paper substrate and the object with which the paper comes into contact to prevent the object from reaching the bulk of the toned surface. Preferably the spacer particles have generally smooth surfaces thereby providing the lubricity to enable objects to slide across their surface and are preferably not readily abradeable themselves. Preferably the spacer particles are generally spherical in shape and relatively uniform in individual particle size. By the term "smooth surface" it is intended to contrast the spacer particles according to the present invention with conventional pigment particles which have a very irregular shaped surface. There are several commercially available particles that are useful in the practice of the present invention. Typically, they are made of polyolefins, polyesters and acrylics. A particularly acceptable group of materials are those made from the polyolefins where by virtue of the inherent nature of the emulsion polymerization process typically used, a particle of generally spherical shape with relatively uniform particle size is obtained. Polyethylene of 6 micrometers and 12 micrometers particle size have proved to be acceptable and successful spacer particles in accordance with the present invention.

The spacer particles are typically applied to the paper substrate through the use of a binder composition wherein a resin binder is empployed to affix the spacer particles to the surface of the paper substrate. Typically, the coatung composition comprises 15 to 50% by weight solids of resin and spacer particles, of which about 10% by weight are spacer particles and 50 to 85% by weight of a suitable solvent. Typical solvents include toluene, methyl ethyl ketone, acetone, ethyl acetate, and mixtures thereof.

Any suitable resin binder may be employed in the practice of the present invention. Typical materials include polyesters, polyamides, polyvinyl alcohol, polyvinyl acetates, polyvinylidene chloride, polystyrenes, and numerous acrylic terpolymers. Typical specific materials include vinyl resins such as vinyl chloride/vinyl acetate/maleic acid terpolymer commercially available as VMCH resin from Union Carbide Company and a vinyl resin such as vinyl toluene acrylic terpolymer resin such as Pliolite OMS manufactured by Goodyear Company and mixtures thereof. In a preferred aspect of the present invention, the resin binder is selected such that upon contact with the liquid developer, and in particular upon contact with the vehicle of which the liquid developer is manufactured, the resin softens to such a degree that it has an adhesive action on the toner particles thereby more securely holding them to the paper substrate. Typical of the vehicles used in liquid developers which may interact with the above-identified vinyl resins to soften the resins are the paraffinic hydrocarbons commercially available as Isopar from Exxon Chemical Company or Shell Sol from Shell Oil Company.

The coating composition containing the spacer particles may have other additives present for a variety of purposes. It may have dispersing agents, brightener, opacifiers and plasticizers as is conventionally done in coating paper. It may also have clay and other pigments including silica pigments such as Ansilex available in relatively small quantities. Although the typical particle size of conventional pigments is of the order of a micrometer or less the quantity of additional pigments such as clay and silica pigments should be limited so as not to diminish the spacing frequency of the spacer particles according to the present invention. The coating resin composition is prepared in a conventional manner wherein a portion of the resin is initially dissolved in a portion of the solvent by stirring followed by the addition of the pigment. The preferred polyolefin spacer particles according to the present invention may be added to the coating composition merely by mechanical stirring since they do not require a high level of sheering energy to disperse them in the liquid resin. If additional pigments such as silica or clay are desired a high shear mixer may have to be used to insure dispersion of the particles in the coating composition.

The substrate from which the coated paper, according to the present invention may be made may be selected from a wide variety of commercially available papers including those which have been used in electrostatographic reproducing apparatus previously such as high quality paper, medium quality paper, transparent paper. In this regard it should be noted that it is not limited to use with cellulosic papers but rather other non-cellulosic papers such as the polyester papers may be used. The substrate should have a reasonable degree of whiteness, brightness and smoothness having a Sheffield smoothness of the order of 50 to 100 as well as being resistant to the solvent in the coating composition striking through the substrate. In particular the substrate may have a smooth surface with a conventional clay sizing coating having been applied during manufacture of the substrate. Preferably, since the coated paper is going to be used in the preparation of a xeromamogram it will be made of a reasonably heavy paper to approximate an X-ray film. Accordingly, typical papers have a basis weight of 75 to 220 grams per meter square and a caliber of from 4 to 10 mils.

The coating composition comprising the spacer particles may be applied to the substrate in any suitable manner. Typical conventionally employed coating techniques include Meyer rod, reverse roll coating, gravure roll coating or blade coating. One or both sides of the substrate may be coated depending upon whether simplex or duplex imaging capability is required. Prior to coating the composition onto the substrate, the composition may be filtered to remove undissolved aggregates. A particularly preferred manner of applying the coating to the substrate is by means of conventional Meyer rod wherein a solution of the coating composition is poured onto a rod having wire wrapped tightly around it in a spiral configuration such that the wire contacts the substrate at uniform intervals and the coating solution is metered onto the substrate in the areas where the wire does not contact the substrate. The coating composition may be applied to the substrate in the thickness desired. For example, the coating may be present on the substrate in amounts from about 5 pounds to about 15 pounds per 3,000 square foot ream of substrate. Subsequent to coating the composition on the substrate it is passed through a hot air drying system such as an oven which can be maintained at temperatures of the order of 120° to 160° F. and adjusted to result in the final paper moisture content of from about 3 to about 5%.

Figure 2:
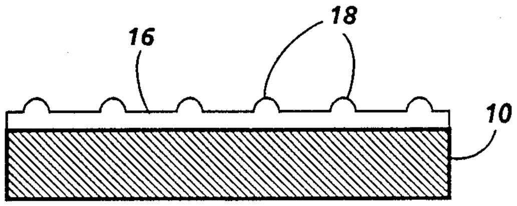
FIG. 2 is an enlarged schematic representation in cross section of a coated paper suitable for use in an electrostatographic process for receiving a toner image with a liquid developer according to the present invention.

FIGS. 1 and 2 are grossly enlarged sectional views (about 70 power magnification) of the paper according to the present invention, FIG. 2, contrasted with a conventional clay coated paper, FIG. 1, in commercial use today. In both figures, reference numeral 10 represents the substrate. In FIG. 1 reference numeral 12 represents the resin binder having a regularly shaped small size clay particles bound on the surface of the substrate. In contrast in FIG. 2 the resin binder layer 16 has substantially larger smooth surfaced, generally spherical spacer particles 18 uniformly distributed throughout.

The following example is intended to be illustrative, the invention not being limited to the materials and conditions or process parameters set forth in this embodiment.

EXAMPLE 1

A coated paper, prepared according to the present invention, suitable for use in xeroradiography was produced from a 200 grams per square meter (gsm) base stock having a caliper of 8.2 mils. The base was obtained from the Union Camp Corporation. it was coated on both sides with a coating color consisting of a mixture of styrene-butadiene latex, coating clay and titanium dioxide. The coating provided a base layer for subsequent coating and imparted coating solvent holdout to the sheet. After coating the sheet was passed through a machine calender stack to impart smoothness and levelness to the surface.

A coating dispersion was prepared from the following formula in which all parts are by weight:

| | |
|---|---|
| 34.5 parts | Pliolite OMS |
| 6.1 parts | VMCH Resin |
| 4.5 parts | Polymist B-12 |
| 0.5 part | Cyastat 609 |
| 150 parts | Ethyl acetate |
| 105 parts | Acetone |

Pliolite OMS is a vinyltoluene acrylic terpolymer available from the Goodyear Company of Akron, Ohio. VMCH resin is a vinyl chloride/vinyl acetate/maleic acid terpolymer commercially available from Union Carbide Corporation of Danbury, Conn. Polymist B-12 is a nearly spherical polyethylene pigment of 12 micrometers diameter and is available from the Allied Corporation of Morristown, N.J. Cyastat 609 is an alochol solution of N,N-bis-(2-hydroxyethyl)-N,N-(3'dodecyloxy-2'-hydroxypropyl)-methylammonium methosulfate which is available from the American Cyanamid Company of Wayne, N.J. and is present as an antistatic agent.

The ethyl acetate and acetone were combined in a blender and the Cyastat 609 was added. The Pliolite OMS and VMCH resins were added with stirring and stirring continued until solution was obtained. Polymist B-12 pigment was then added and the suspension stirred for a few minutes to obtain a uniform dispersion.

The smoothest side of the precoated base paper was then coated with the above coating using a number 14 Meyer rod. The coated sheet was dried in a forced air oven at 120° C. The final product had a caliper of 8.4 mils and the 0.1 mil thick coating was present at 17 grams per square meter. The final basis weight of the coated paper was 217 gsm. The coated surface had a Sheffield smoothness value of 90.

Sheets of the above coated paper were used as the receiver sheet in the Xerox 175 xeroradiographic processor, wherein a liquid toner image is electrostatically transferred to the coated surface of the receiver sheet. The transferred liquid toner image is air dried to complete the fixing process.

Images so produced were then compared to those produced on conventional xeroradiographic paper having only a coating prepared using conventional clay pigments, instead of the spherical plastic bearing spacer pigments. The sheets with the plastic bearing spacer pigments had a higher level of visible gloss than those containing conventional clay pigments. The toner image on each sheet had a soft matte finish.

When toned xeroradiographic images on the conventional papers were subjected to handling by lightly drawing fingernails across the images or by lightly rubbing with a plastic pen holder, visible marks were made where the fingernails or pen holder contacted the image surface. The pressure exerted by these objects caused an increase in the gloss of the toner image in the area contacted by the objects. When the same exercise was performed on the imaged sheets from the process of the present invention, no visible marks were observed on the toned image surface.

A test fixture was fashioned from a small cart-like apparatus with four rubber wheels attached to a cart bed 1 inch wide by 2 inches long. This cart could be rolled across the surface of the toned sheets without damaging either coating or toned image. A metal paper clip was attached to the cart fixture so that a positive pressure was applied to the paper surface by the metal wire loop of the appear clip when the cart was held flat on its four wheels. The pressure was adjusted so that a pronounced visible mark was obtained when the fixture was placed flat on the conventional sheet images and slowly rolled across the toner image surface. The mark was caused by an increase in the gloss of the toner image due to the pressure of the metal loop being drawn across it. When the same fixture, without changing the paper clip pressure adjustment, was drawn across the surface of the toned image on the plastic spacer pigment containing sheet, no change in toner image gloss was observed. Therefore, no visible mark was observable as a result of passage of the test fixture.

Thus, according to the present invention, a coated paper suitable for use in an electrostatographic process for receiving an image formed with a liquid developer directly thereon is provided wherein contact of the image surface with another medium or object does not result in the toned image area having a non-uniform gloss surface. As a result, xeroradiographic images on coated papers are much easier to interpret, errors in interpretation are minimized and loss of information available for interpretation is also minimized. The coated paper according to the present invention also has the advantage of being relatively inexpensive.

The disclosures and the patents referred to herein are hereby specifically and totally incorporated herein by reference.

While the invention has been described with reference to specific embodiments, it will be apparent to those skilled in the art that many alternatives, modifications and variations may be made. For example, while the invention has been illustrated with reference to use in a liquid development system, it will be appreciated that it may also have application in dry development systems. Accordingly, it is intended to embrace all such alternatives, modifications as may fall within the scope of the appended claims.

I claim:

1. A coated paper suitable for use in an eletrostatographic process for a toner image formed with a liquid developer, said paper comprising a substrate and bound thereto by a resin binder on at least one side generally smooth surfaced spherical bearing spacer particles having a substantially uniformly particle size of from about 5 to about 15 micrometers extending through the resin binder and being substantially uniformly distributed on at least one side of said substrate.

2. The coated paper per of claim 1 wherein said particles have a particle size of from about 8to about 12 micrometers.

3. The coated paper of claim 1 wherein said particles are a polyolefin.

4. The coated paper of claim 3 wherein said particles are polyethylene having a particle size of about 12 micrometers.

5. The coated paper of claim 1 wherein said paper has a basis weight of from about 75 to about 220 grams per square meter and a caliper of from about 4 to about 10 mils.

6. The coated paper of claim 1 wherein, said spacer particles and resin binder having been applied to said substrate as a composition comprising 15–50% by weight solids of resin and spacer particles of which about 10% by weight are spacer particles, and 50–85% by weight solvent the composition being applied at a rate of about 5 to about 15 pounds per 3000 square foot ream.

7. An article of manufacture comprising a paper sheet substrate and a coating on at least one side thereof said coating comprising generally smooth surfaced, spherical, bearing, spacer particles in a resin binder bound to said substrate, said particles having a substantially uniform particle size of from about 5 to about 15 micrometers extending through the resin binder and being substantially uniformly distributed on at least one side of said substrate.

8. The article of claim 7 wherein said particles have a particle size of from about 8 to about 12 micrometers.

9. The article of claim 7 wherein said particles are polyolefin.

10. The article of claim 9 wherein said particles are polyethylene having a particle size of about 12 micrometers.

11. The article of claim 7 wherein said paper sheets substrate has a basis weight of from about 75 to about 220 grams per square meter and a caliper of from about 4 to about 10 mils.

12. The coated paper of claim 7 wherein said coating has been applied to said substrate as a composition comprising 15–50% by weight solids of resin and spacer particles, of which about 10% by weight are space particles, and 50–85% by weight solvent, the composition being applied at a rate of about 5 to about 15 pounds per 3000 square foot ream.

* * * * *